(12) United States Patent
Abraham

(10) Patent No.: US 9,906,536 B1
(45) Date of Patent: Feb. 27, 2018

(54) DATA REPORTING - PROCESS INTEGRATION TOOL

(71) Applicant: Bank of America Corporation, Charlotte, NC (US)

(72) Inventor: John Abraham, Belle Mead, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/354,256

(22) Filed: Nov. 17, 2016

(51) Int. Cl.
*G06F 7/04* (2006.01)
*H04L 29/06* (2006.01)

(52) U.S. Cl.
CPC ........ *H04L 63/102* (2013.01); *H04L 63/0428* (2013.01)

(58) Field of Classification Search
CPC .... H04L 63/08; H04L 63/102; G06F 21/6218
See application file for complete search history.

(56) References Cited

U.S. PATENT DOCUMENTS

| 8,522,192 | B1* | 8/2013 | Avalos | G06F 9/45512 717/100 |
| 8,935,799 | B1* | 1/2015 | Anderson | G06F 21/6218 726/19 |
| 2006/0041844 | A1* | 2/2006 | Homiller | H04L 29/06 715/734 |
| 2006/0218123 | A1* | 9/2006 | Chowdhuri | G06F 17/30445 |
| 2014/0372623 | A1* | 12/2014 | Chen | H04L 47/30 709/231 |
| 2015/0058931 | A1* | 2/2015 | Miu | H04L 63/126 726/3 |

* cited by examiner

*Primary Examiner* — Ali Abyaneh
(74) *Attorney, Agent, or Firm* — Michaeil A. Springs

(57) ABSTRACT

A reporting tool includes a retrieval engine, a context switching engine, a reporting engine, a publication engine, and a subscription engine. The retrieval engine retrieves a request for subscription data. The context switching engine receives security information indicating whether a user is authorized to view reporting data. The reporting engine generates a plurality of batches of reporting data. The publication engine generates the data report by processing the batches. The subscription engine communicates the data report.

12 Claims, 8 Drawing Sheets

# DATA REPORTING - PROCESS INTEGRATION TOOL

TECHNICAL FIELD

This disclosure relates generally to analyzing network node performances for completing data processing jobs to identify and correct network node errors and failures.

BACKGROUND

Servers and databases store information in the form of data. In some instances, data is transmitted within a network environment. For example, data may be transmitted to perform an Extract Transform Load (ETL) job. Transmitting data within a network environment uses computing resources such as memory, storage, network bandwidth, and central processing unit resources. Node data information may be retrieved with the use of a Load Sharing Facility (LSF).

SUMMARY OF THE DISCLOSURE

According to an embodiment, a reporting tool includes a retrieval engine, a context switching engine, a reporting engine, a publication engine, and a subscription engine. The retrieval engine retrieves a request for a subscription to a data report that includes a summary of reporting data. The request includes reporting data information indicating the reporting data to include in the data report. The request further includes frequency information indicating a frequency to communicate the data report to the first user. The request also includes authentication information, authenticating the identify of a first user.

The context switching engine communicates a request for security information to one or more databases. The request includes the authentication information. The context switching engine then receives the security information from the one or more databases. The security information indicates whether the first user is authorized to view the reporting data.

The reporting engine receives the reporting data from the one or more databases and generates a plurality of batches, wherein each batch comprises a subset of the reporting data. The publication engine generates the data report by processing the plurality of batches in parallel and aggregating the processed batches to generate the data report. The publication engine further determines whether the request comprises a request to communicate the data report to one or more additional users.

The subscription engine communicates the data report to the first user. Upon a determination that the request comprises a request to communicate the data report to additional users, the subscription engine communicates the data report to the one or more additional users.

According to another embodiment, a method includes retrieving a request for a subscription to a data report comprising a summary of reporting data. The method further includes receiving the security information from the one or more databases, the security information indicating whether the first user is authorized to view the reporting data. The method further includes receiving the reporting data from the one or more databases. The method further includes generating a plurality of batches, wherein each batch comprises a subset of the reporting data. The method further includes generating the data report. The method further includes determining whether the request comprises a request to communicate the data report to one or more additional users. The method further includes communicating the data report to the first user. Upon a determination that the request comprises a request to communicate the data report to additional users, the method further includes communicating the data report to the one or more additional users.

Certain embodiments provide one or more technical advantages. For example, an embodiment improves data upload speed by processing and updating data in parallel. As another example, an embodiment reduces processing and memory usage by identifying and facilitating correcting errors in network nods. Certain embodiments decrease data uploading errors and failures. For example, certain embodiments gather data upload analytics from network nodes used to process a data upload job. Certain embodiments may determine job analytics comprising information from each network node to determine errors in completing a data processing and upload job. Certain embodiments may identify and correct network nodes that are not functioning properly, thus reducing or eliminating data uploading errors and failures.

Creating data reports requires the use of computer resources such as processing and memory usage. Certain embodiments create a single data report for multiple users rather than a data report for each user, reducing processing and memory usage. Certain embodiments decrease the processing usage by reducing or eliminating data reports with outdated data. In certain embodiments, data is checked to ensure that it is current before processing the data to create a data report. This reduces or eliminates creating unusable data reports and thus reduces or eliminates the processing usage required to recreate data reports with updated information. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
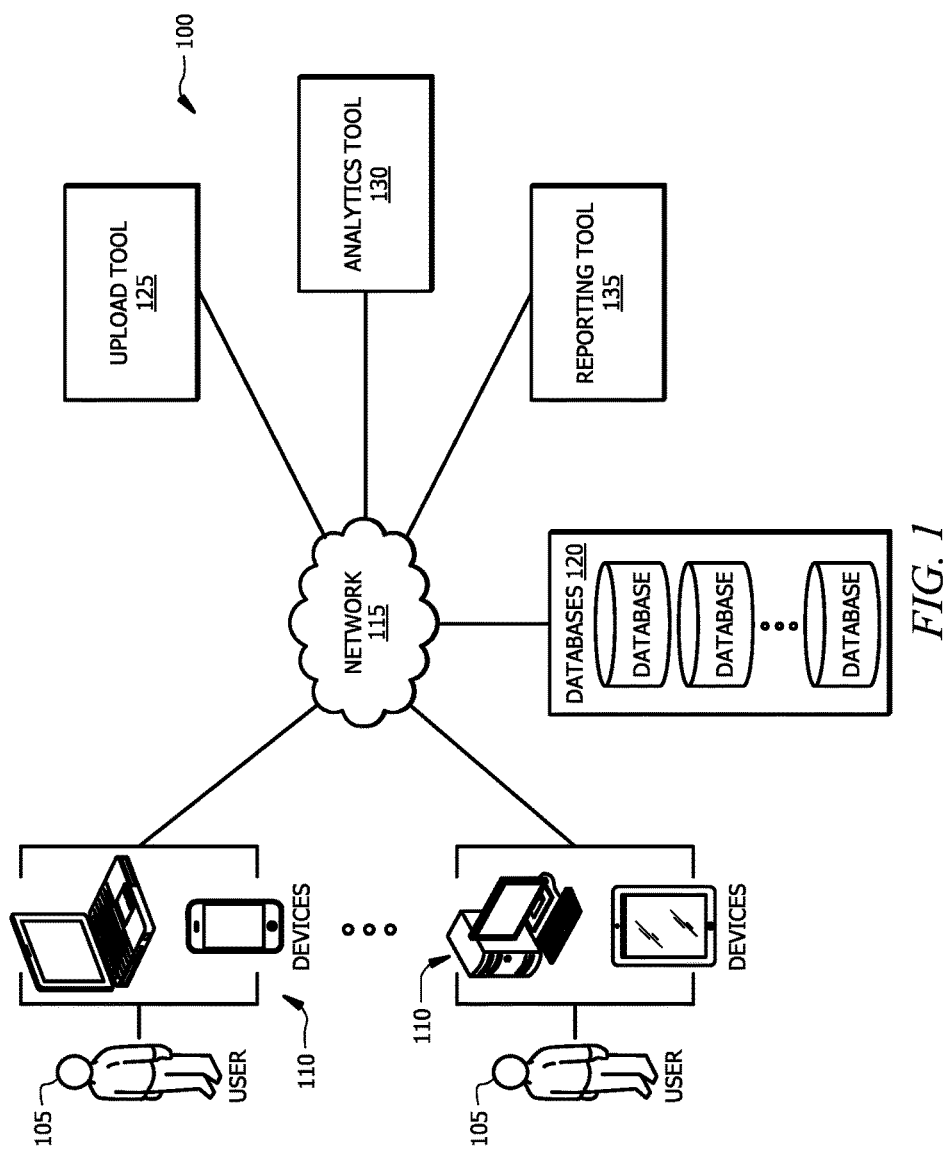
FIG. 1 illustrates a system for data transmission and analysis within a network environment, in some embodiments.

Embodiments of the present disclosure and its advantages are best understood by referring to FIGS. 1 through 8 of the drawings, like numerals being used for like and corresponding parts of the various drawings.

Servers and databases store and use information in the form of data. Data may be aggregated to form data tables. In some instances, data is processed to create a data table and the data table is uploaded to a server. As the number of data entries in a dataset increases, computer processing and uploading requirements to generate the dataset increases. As datasets become larger, systems may fail to process and upload data within a given time constraint.

This disclosure contemplates an upload tool that generates data tables and increases the processing power of a system by processing and uploading data in the data tables in parallel. The upload tool receives a plurality of data files and generates a data table comprising data from the plurality of data files. The upload tool determines whether the data table comprises more than a predetermined number of rows of data. When the data table comprises more than a predetermined number of rows, the upload tool generates a plurality of batches, wherein each batch comprises a subset of the plurality of data rows. The upload tool communicates the batches to a plurality of network nodes, and the network nodes process and upload the batches in parallel.

A data processing and uploading job may be broken into a plurality of subsets. For example, an upload tool may generate batches, where each batch is a subset of the data processing and uploading job. Each batch is sent to one of a plurality of network nodes for data processing and uploading.

Existing systems gather analytics from network nodes, but are unable to gather analytics for an entire job. Existing systems are ignorant of which network nodes were utilized to complete a data processing and uploading job.

This disclosure contemplates a data analytics tool operable to determine network nodes utilized to complete a data processing and uploading job. The data analytics tool gathers analytics for each network node used to complete a data uploading and/or processing job. For example, the data analytics tool determines the amount of memory usage, processing usage, and network bandwidth usage utilized by a network node. As another example, the data analytics tool determines the time required to process a batch of the data processing job. This provides the technical advantage of identifying network nodes that are not functioning properly. For example, if a network node uses a large amount of, e.g., memory and/or takes a relatively long time to complete processing a batch of data, the analytics tool may determine that the network node is not functioning properly and may facilitate correcting the network node.

The analytics tool aggregates the data analytics of each network node to generate data analytics for the data processing and uploading job. The data analytics tool determines the amount of memory usage, processing usage, and network bandwidth usage utilized to complete the data processing and uploading job. As another example, the data analytics tool determines the time required to process a data processing job. The data analytics tool determines whether the job expended more computer resources than expected and/or took longer than expected. If the data analytics tool makes this determination, it may indicate that the job comprises an error. For example, data in the job may comprise errors. As another example, instructions provided to one or more of the plurality of network nodes may comprise an error. The analytics tool facilitates identifying and correcting errors. Correcting errors decreases the computer resource usage of data processing and upload jobs.

This disclosure also recognizes the technical advantage of eliminating or reducing errors and failures of data processing and uploading jobs.

Data uploaded in a database and stored in a data table may be used to provide information to multiple users. For example, a user may request a data report that includes a summary of data in a data table. Systems process data to generate a data report. Traditional systems generate data reports in response to a request from each user. As the number of requests increase, systems must generate an increased number of data reports. This leads to an increased amount of processing usage.

This disclosure contemplates a reporting tool that reduces the amount of processing power required to provide data reports to a plurality of users. The analytics tool may receive a plurality of requests for a data report for a plurality of users. The analytics tool may determine that the requests are the same or substantially the same and generate a single report to respond to each of the plurality of requests.

The reporting tool receives a request for a data report subscription for a data report that provides a summary of data in a plurality of files. The request may comprise a username and password. The upload tool communicates a request for security information to one or more databases, the security information indicating whether the user is authorized to view one of the plurality of files. The reporting tool determines whether the user is authorized to view the plurality of files. Upon a determination that the user is authorized, the reporting tool generates the data report. This disclosure recognizes the technical advantage of increasing data security by determining security information for the user. The upload tool determines whether to communicate the data report to additional approved users, thus reducing the amount of computer processing power required to generate and communicate data reports to a plurality of users.

This disclosure contemplates a fully integrated solution for generating, uploading, maintaining, and communicating data. In some embodiments, the solution comprises an upload tool, an analytics tool, and an upload tool. This system provides one or more technical advantages. For example, an embodiment improves data upload speed by processing and updating data in parallel. As another example, an embodiment reduces processing and memory usage. Certain embodiments decrease data uploading errors and failures. For example, certain embodiments gather data upload analytics from network nodes used to process a data upload job. Certain embodiments may determine job analytics comprising information from each network node to determine errors in completing a data processing and upload job. Certain embodiments may identify and correct network nodes that are not functioning properly, thus reducing or eliminating data uploading errors and failures.

FIG. 1 illustrates a system 100 for data communication and analysis. As illustrated in FIG. 1, system 100 includes users 105, devices 110, network 115, databases 120, upload tool 125, analytics tool 130, and reporting tool 135. In particular embodiments, system 100 increases data transfer speeds and reduces processing and memory demand in a data communication and storage environment.

Devices 110 may be any devices that operate and/or communicate with other components of system 100. In general, devices 110 facilitate creating a job to upload a temporary data table, perform analytics on the job, and generate data reports using, e.g., the temporary data table. For example, devices 110 communicate a request to upload tool 125 to generate and upload a temporary data table. As another example, devices 110 communicate a request to analytics tool 130 to perform analytics on the upload. As yet another example, devices 110 communicate a request to reporting tool 135 to generate a data report and communicate the report to devices 110 for one or more users 105. Devices 110 may be associated with an enterprise or a business unit within an enterprise. Devices 110 and/or their associated enterprises may collect and/or consume data. Devices 110 may facilitate transferring and receiving data for consumption.

This disclosure contemplates device 110 being any appropriate device for sending and receiving communications over network 115. As an example and not by way of limitation, device 110 may be a computer or a laptop. This disclosure contemplates scaling device 110 to a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

System 100 comprises databases 120. System 100 may comprise a single database 120 or any number of databases 120. Databases 120 stores data to be processed. For example, the data may be contained in a flat file. As another example, the data may be stored in a table structure. This disclosure contemplates databases 120 storing any suitable data type.

A user 105 may request to analyze, manipulate, and/or summarize data from a plurality of data files stored in database 120. One or more of the plurality of data files may have security restrictions. A user may be required to authenticate his or her identity before accessing one of the plurality of data files. For example, a user may be required to enter a username and password. As another example, a user may be required to input biometric data. Providing authentication information for each plurality of data files is burdensome. This disclosure recognizes the advantage of receiving data from the plurality of data files and generating a temporary data table using the data from the plurality of data files. The temporary data file may be associated with a single authentication requirements. Thus, a user 105 may only provide a single authentication to access the data from the plurality of data files. The temporary data file may be uploaded to a database such as database 120. This disclosure recognizes the advantage of breaking the data table into a plurality of data batches based on database partitions and uploading the batches in parallel, thus increasing the speed of the data upload.

In an exemplary embodiment, upload tool 125 receives a request to generate a temporary data table using data from a plurality of files. The request may comprise a username and password for each of the plurality of data files. The request may further include a name, description and one or more column definitions for the temporary data table. The column definitions may indicate the type of data in a column of the temporary data table. For example, a column may indicate that the data in a column is account balance data.

Upload tool 125 receives the plurality of data files and generates a temporary data table that includes the temporary data table name, description, and one or more columns associated with the one or more column definitions. The data from the plurality of data files is placed in the rows of the temporary data table. The upload tool generates authentication information for the temporary data table. For example, the authentication information may require a username and password to access the temporary data table. Upload tool 125 breaks the temporary data table into batches and uploads the batches to a database such as database 120. Upload tool 125 is discussed in more detail in the text relating to FIG. 3. The components of upload tool 125 are discussed in more detail in the text relating to FIG. 2.

A plurality of network nodes upload the batches generated by upload tool 125. This disclosure recognizes the advantages of receiving analytics from the network nodes. Analytics may include the amount of memory usage, processing usage, and network bandwidth usage utilized by a network node. As another example, analytics may include the time required to process a batch of the data processing job. This provides the technical advantage of identifying network nodes that are not functioning properly. For example, if a network node is using a large amount of, e.g., memory and/or takes a relatively long time to complete processing a batch of data, the analytics tool may determine that the network node is not functioning properly and may facilitate correcting the network node. The analytics tool aggregates data analytics of each network node to generate data analytics for the data processing and uploading job. This disclosure further recognizes the advantages of determining analytics for a data processing and uploading job. For example, a data processing and uploading job may be broken into a plurality of batches and each batch may be uploaded by a separate network node based on the database partitions. Receiving analytics for a job as a whole provides the technical advantage of identifying and correcting errors in a temporary data table. For example, data in the job may comprise errors. As another example, instructions provided to one or more of the plurality of network nodes may comprise errors. This decreases the computer resource usage of data processing and upload jobs. This disclosure also recognizes the technical advantage of eliminating or reducing errors and failures of data processing and uploading jobs.

In another exemplary embodiment, analytics tool 130 determines analytics for network nodes and data processing and upload jobs. For example, analytics tool 130 receives a request to determine analytics for a job. Analytics tool 130 determines the network nodes associated with the job and determines analytics for each network node. Analytics tool 130 aggregates the analytics for each of the plurality of network nodes to determine analytics for the data processing and uploading job. In some embodiments, analytics tool 130 determines network node analytics in real time or substantially real time and the network node is processing and uploading data to database 120. This disclosure contemplates substantially real time being up to a period of ten minutes after real time. Analytics tool 135 may generate a report comprising the job analytics and communicate the report to one or more users 105. For example, analytics tool 130 may communicate the report via email. As another example, analytics tool 130 may communicate the report via a user interface. Analytics tool 130 may generate the report in a standard format that is compatible with a number of user interfaces. In some embodiments, analytics tool 130 compares job analytics to the analytics of a previous job. This comparison may indicate an error in processing and/or uploading the job. For example, analytics tool 130 compares analytics for two previous jobs If the analytics for each job (e.g., memory usage, processor usage, network bandwidth usage, time to complete job) differs by a predetermined amount analytics tool 130 may generate an alert to indicate that the job may include an error. Analytics tool 130 is discussed in more detail in the text relating to FIG. 4. The components of analytics tool 130 are discussed in more detail in the text relating to FIG. 2.

Data in the temporary data table may be used to generate data reports for one or more users 105. For example, a user 105 may request to receive a data report summarizing data in the temporary data table. The user 105 may determine to receive the data report at a particular frequency (e.g., once a day, once a month, or any other suitable frequency). The temporary data table may be updated. This disclosure recognizes the advantages of determining whether the temporary data table is up to date before generating data reports. This disclosure further recognizes the advantages of determining whether to communicate the data report to multiple users 105. This allows one data report to be created for a plurality of users 105.

In yet another exemplary embodiment, reporting tool 135 generates data reports using the temporary data table and communicates the data reports to devices 110 for view by users 105. Reporting tool receives a request for a data report subscription from user 105 via devices 110. The request includes reporting data that identifies the data to include in the data report. The request further includes a frequency to generate the report and authentication information for user 105. Reporting tool 135 receives security information based on the authentication information. The security information indicates whether user 105 has access to the requested data. If the user 105 does have access to the requested data, reporting tool receives files with the data from database 120. Reporting tool 135 processes the data to create a data report. If the dataset is large, reporting tool 135 breaks the data processing job into batches and processes the batches in parallel. Reporting tool 135 determines the users 105 to communicate the data report and communicates the data report. Reporting tool 135 is discussed in more detail in the text relating to FIG. 5. The components of reporting tool 135 are discussed in more detail in the text relating to FIG. 2.

Modifications, additions, or omissions may be made to system 100 without departing from the scope of the invention. For example, system 100 may include any number of devices 110, and/or databases 120. As a further example, the components of system 100 may be integrated or separated. For example, in particular implementations, upload tool 125, analytics tool 130, and/or reporting tool 135 may be combined as a single tool.

Figure 2:
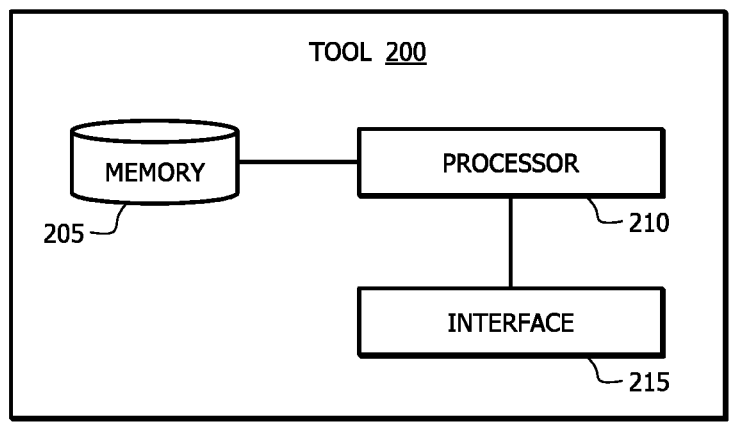
FIG. 2 illustrates a network tool, in some embodiments.

FIG. 2 illustrates a network tool 200, in some embodiments. Network tool 200 may be representative of upload tool 125, analytics tool 130, and/or reporting tool 135 of system 100 of FIG. 1. In the illustrated embodiment, network tool 200 includes processor 210, interface memory 205, and interface 215.

Processor 210 is any electronic circuitry, including, but not limited to microprocessors, application specific integrated circuits (ASIC), application specific instruction set processor (ASIP), and/or state machines, that communicatively couples to memory 205 and interface 215 and controls the operation of network tool 200. Processor 210 may be 8-bit, 16-bit, 32-bit, 64-bit or of any other suitable architecture. Processor 210 may include an arithmetic logic unit (ALU) for performing arithmetic and logic operations, processor registers that supply operands to the ALU and store the results of ALU operations, and a control unit that fetches instructions from memory 205 and executes them by directing the coordinated operations of the ALU, registers and other components. Processor 210 may include other hardware and software that operates to control and process information. Processor 210 executes software stored on memory 205 to perform any of the functions described herein. Processor 210 controls the operation and administration of network tool 200 by processing information received from network 115, device(s) 110, and memory 205. Processor 210 may be a programmable logic device, a microcontroller, a microprocessor, any suitable processing device, or any suitable combination of the preceding. Processor 210 is not limited to a single processing device and may encompass multiple processing devices.

Memory 205 may store, either permanently or temporarily, data, operational software, or other information for processor 210. Memory 205 may include any one or a combination of volatile or non-volatile local or remote devices suitable for storing information. For example, memory 205 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 205, a disk, a CD, or a flash drive. In particular embodiments, the software may include an application executable by processor 210 to perform one or more of the functions described herein. This disclosure contemplates memory 210 storing any of the elements stored in databases 120 and/or by network tool 200.

Interface 215 represents any suitable device operable to receive information from network 115, transmit information through network 115, perform suitable processing of the information, communicate to other devices, or any combination of the preceding. For example, interface 215 transmits data to devices 110, databases 120, and/or any other suitable component of system 100. As another example, interface 215 receives data from devices 110, databases 120, and/or any other suitable component of system 100. Interface 215 represents any port or connection, real or virtual, including any suitable hardware and/or software, including protocol conversion and data processing capabilities, to communicate through a LAN, WAN, or other communication systems that allows network tool 200 to exchange information with components of system 100.

Modifications, additions, or omissions may be made to network tool 200 without departing from the scope of the invention. For example, network tool 200 may include any number of processors 210, memory 205, and/or interfaces 210. Furthermore, the components of system 100 may be integrated or separated. For example, in particular implementations, memory 205 may be separated into multiple memories 205 to store the data descried herein.

Figure 3:
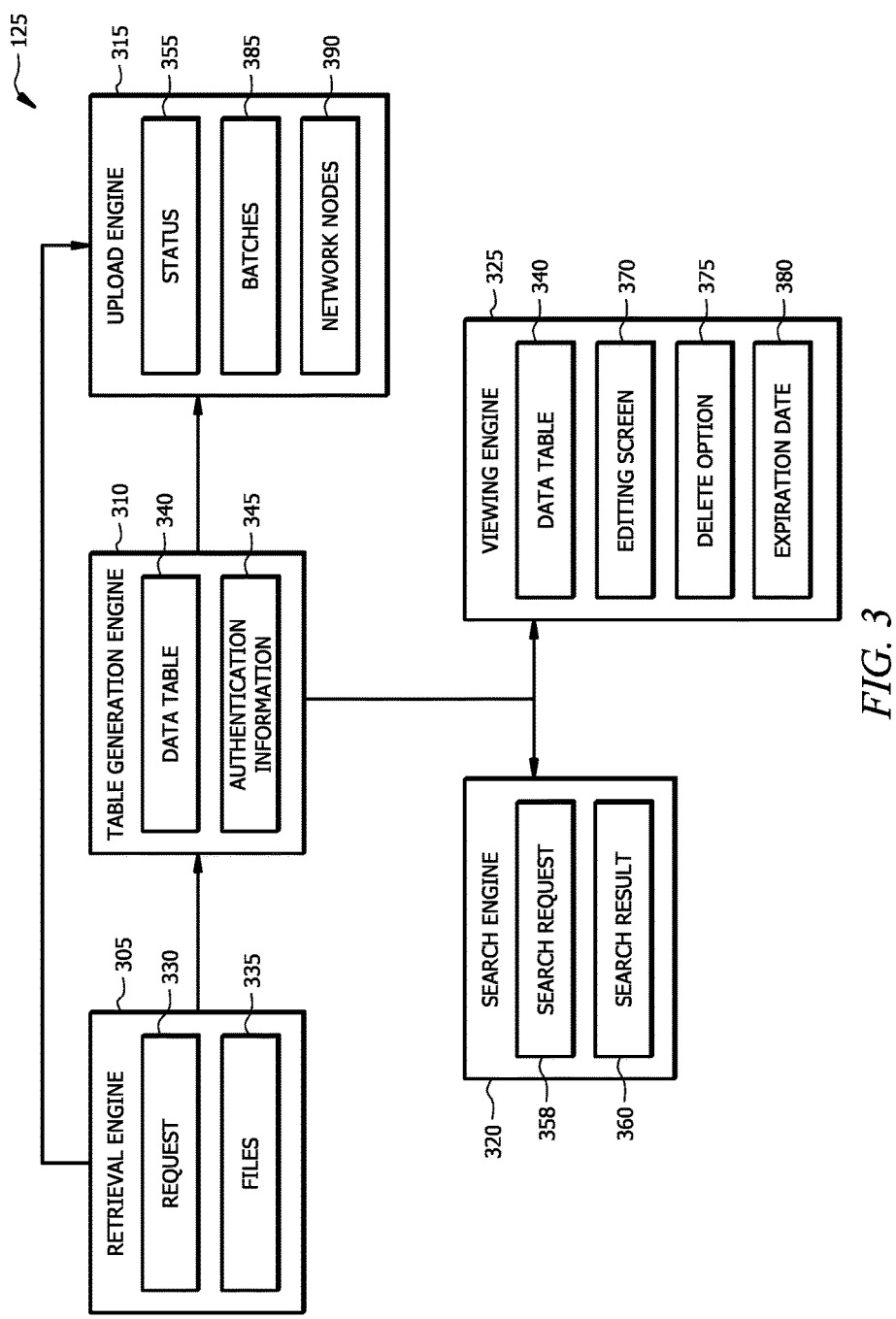
FIG. 3 illustrates the upload tool of FIG. 1, in some embodiments.

FIG. 3 illustrates upload tool 125 of system 100, in some embodiments. As illustrated in FIG. 3, upload tool 125 includes retrieval engine 305, table generation engine 310, upload engine 315, search engine 320, and viewing engine 325. In particular embodiments, upload tool 125 increases data uploading and processing speeds by processing batches of data in parallel.

Retrieval engine 305 receives request 330 and files 335. Retrieval engine 305 may receive request 330 from one or more user devices 110. Request 330 may include a request to generate a temporary data table 340 from a plurality of files 335. Request 330 may include a username and password for each of the files 335. For example, files 335 may have restricted access. Retrieval engine may retrieve files 335 using the username and passwords included in request 330. Request 330 may include a table name. The table name is used to name the temporary data table 340. Request 330 may comprise a data table description for temporary data table 340. For example, the data table description may allow a user 105 to determine the contents of data table 340. Request 330 may comprise one or more column definitions. A column definition indicates a data type of the data in a column of a table. Examples of column definitions include a date, an account balance, a FICO credit score, or any other of data descriptor.

Retrieval engine 305 retrieves files 335 in response to request 330. Retrieval engine 305 is a network interface in some embodiments. Files 335 are any type of data file. Files 335 may be stored in one or more databases 120 or any other suitable location. Files 335 may include flat files. As another example, files 335 may include data tables. Files 335 may be tab delimited files. In certain embodiments, retrieval engine 335 retrieves a file 335 using a username and password associated with the file 335 from request 330.

An example algorithm for retrieval engine 305 is as follows: wait for request 330; receive request 330 from one or more devices 110; in response to receiving request 330, retrieve files 335 from database 120; receive files 335; communicate request 330 and files 335 to table generation engine 310 and upload engine 315.

Table generation engine 310 uses request 330 and files 335 to generate temporary data table 340, authentication information 345, and batches 350. Table generation engine 310 parses request 330 to determine instructions for generating temporary data table 340. Temporary data table 340 may include a plurality of rows and a plurality of columns. Table generation engine generates temporary data table 340 using data from files 335. Data entries from files 335 may be used to populate one or more rows of data. Temporary data table 340 may also include the data table name table description from request 330. Each of the plurality of columns may be associated with a column definition from request 330.

Table generation engine 310 generates authentication information 345 for temporary data table 340. Authentication information 345 restricts access to temporary data table 340. In some embodiments, authentication information is submitted before a user is permitted to access data table 340. For example, authentication information 345 may comprise one or more passwords. A user 105 may be required to submit the one or more passwords before gaining access to temporary data table 340. Authentication information 345 may comprise biometric data or any other suitable information to authenticate a user's 105 identity.

An example algorithm for retrieval engine 305 is as follows: wait for request 330; receive request 330 and files 335 from retrieval engine 305; generate temporary data table 340 in response to receiving request 330; generate authentication information 345; communicate data table 340 to upload engine 315, search engine 320, and/or viewing engine 325.

Upload engine 315 receives request 330 and temporary data table 340 and facilitates uploading temporary data table 340 to database 120. Upload engine 315 determines the number of rows in temporary data table 340. Upon a determination that temporary data table 340 comprises more than a predetermined number of rows, upload engine 315 generates batches 385. For example, if data table 340 comprises more than one million rows, upload engine 315 generates batches 385. Request 330 may include the predetermined number of rows. Request 330 may instruct upload engine 315 to create batches 385 of a predetermined size. As another example request 330 may indicate to break data table 340 into a predetermined number of batches 385, the size of the batches 385 based on the size of temporary data table 340. Upload engine 315 may determine the number of predetermined rows from any suitable component of system 100.

Batches 385 are generally subsets of temporary data table 340. For example, if data table 340 includes one million rows of data, upload engine 315 may generate four batches of data, each with 250,000 rows of data. Upload engine 315 may generate any suitable number of batches 385. Batches 385 may be any suitable size. Each batch 385 may be the same size. Two or more batches 385 may be different sizes. In some embodiments, batches 385 comprise information additional to the rows of data. For example one or more batches 385 may include the table name, table description, column definitions, any other information of request 330, and/or any other suitable information.

Upload engine 315 instructs network nodes 390 to process and upload batches 385. In some embodiments where upload engine 315 does not generate batches 385, upload engine 315 instructs network nodes 390 to upload data table 340. Network nodes 390 are network components with the functionality to process data and upload the data to database 120. For example, a network node 390 may be a server, a device 110, or any other suitable computing device. Upload engine 315 may determine the availability of one or more network nodes 390 and communicate batches 385 to the network nodes 390 based on their availability. Certain network nodes 390 may have a relatively large amount of computer resources. For example, a network node 390 may have greater processing power, a greater amount of memory, or a greater amount of any other suitable computer resource. Computer resource differences of network nodes 390 may be a result of physical differences in the network nodes 390. As another example, computer resource difference of network nodes 390 may be the result of a network node 390 currently processing one or more unrelated datasets. Upload engine 315 may determine the amount of computer resources required to process and upload a batch 385 and determine a network node 390 that is suitable to upload the batch 385. Upload engine 315 sends each batch 385 to the determined network node 390 for the batch for upload to database 120. In embodiments where upload engine 315 does not create batches 385, upload engine 315 communicates data table 340 to a network node 390 for processing and uploading. Upload engine 315 may instruct network nodes 390 to upload the batches 385 to generate temporary data table 340. In some embodiments, upload engine 315 is further configured to upload batches 385 to a previous data table in database 120 to create a new data table. In these embodiments, the new data table comprises data from the previous data table and from data table 340. Upload engine 315 may facilitate displaying status 335 to user 105 via device 110. Status 335 generally indicates the progress of uploading batches 385. For example status 335 may indicate that an upload is in progress, an upload is complete, or that an upload failed.

An example algorithm for upload engine 315 is as follows: wait for request 330; receive request 330; receive temporary data table 340 from table generation engine 310; determine the number of data rows in temporary data table 340; use request 330 to determine whether the number of rows exceeds a predetermined number of rows; upon a determination that the number of rows exceeds a predetermined number of rows, generate batches 385; determine a network node 390 for each batch 385; communicate instructions to network nodes 390 to process and upload batch 385; and communicate batches 385 to network nodes 390.

Search engine 320 generates search request 358 and receives search result 360 in response to the search request 358. Search request 358 is generally a request to review data from data table 340. For example, search request 358 may be a request to receive all data from data table 340 associated with an account number. In some embodiments, search request 358 is a SQL search request. Searching engine 320 may receive a communication from devices 110 and generate search request 320 in response to the communication. For example, user 105 may use device 110 to request information from data table 340. Search engine 360 receives the communication from device 110 and generates search request 358. Search engine 320 may communicate search request 358 to database 120 and/or any other location where temporary data table 340 is stored. Search engine 320 receives search results 360 in response to search request 358. For example, search engine 320 receives search results 360 from database 120. Search results 360 generally comprise data from temporary data table 340. For example, when search request 320 is a request for all data in temporary data table 340 associated with an account number, search result 360 comprises the requested data.

An example algorithm for search engine 320 is as follows: wait to receive communication from device 110; generate search request 358 in response to the communication from device 110; communicate search request 358 to database 120; and receive search results 360 from database 120.

Viewing engine 325 displays temporary data table 340 and allows user 105 to manipulate data 340 using devices 110. Viewing engine 325 facilitates presenting temporary data table 340 to user 105. In some embodiments, viewing engine 325 communicates temporary data table 340 to user devices 110. User devices 110 may display temporary data table 340. For example, user devices 110 may display temporary data table 340 using a user interface. Viewing engine 340 may facilitate displaying editing screen 370, delete option 375, and/or expiration date 380.

Editing screen 370 is generally a display that allows user 105 to modify temporary data table 340. Editing screen 370 may comprise at least a portion of temporary data table 340 and editing options. Editing options may allow user 105 to add data, delete data, modify data, reorganize data into different columns and/or rows, add columns and/or rows of data to temporary data table 340, delete columns and or rows of data, and/or rename column definitions of one or more columns of data to temporary data table 340. Delete option 375 allows user 105 to delete temporary data table 340. In some embodiments, delete option 375 is a button that user 105 may press to delete temporary data table 340. Delete option 375 may be a virtual button, a physical button, a drop-down menu selection, or any other suitable option that allows user 105 to delete temporary data table 340. Expiration data 380 displays the expiration of temporary data table 340. In some embodiments, temporary data table 340 may be automatically deleted at a predetermined date. Expiration date 380 displays this predetermined date. In some embodiments, user 105 may modify expiration date 380 using device 110. Users 105 may use devices 110 to interact with editing screen 370, delete option 375, and/or expiration date 380 in any suitable manner.

An example algorithm for viewing engine 325 is as follows: Wait to receive data table 340; communicate data table 340 to device 110 for viewing; communicate editing screen 370, delete option 375, and expiration date 380 for viewing; receive communication from device 110 that a user utilized editing screen 370; delete option 375; and/or expiration date 380; update data table 340 in response to the communication from device 110.

Modifications, additions, or omissions may be made to upload tool 125 without departing from the scope of the invention. For example, upload tool 125 may include any number of processors 210 memories 205, and/or interface 215. As another example, upload tool 125 may be combined with analytics tool 130 and/or reporting tool 135 to form a single tool.

Figure 4:
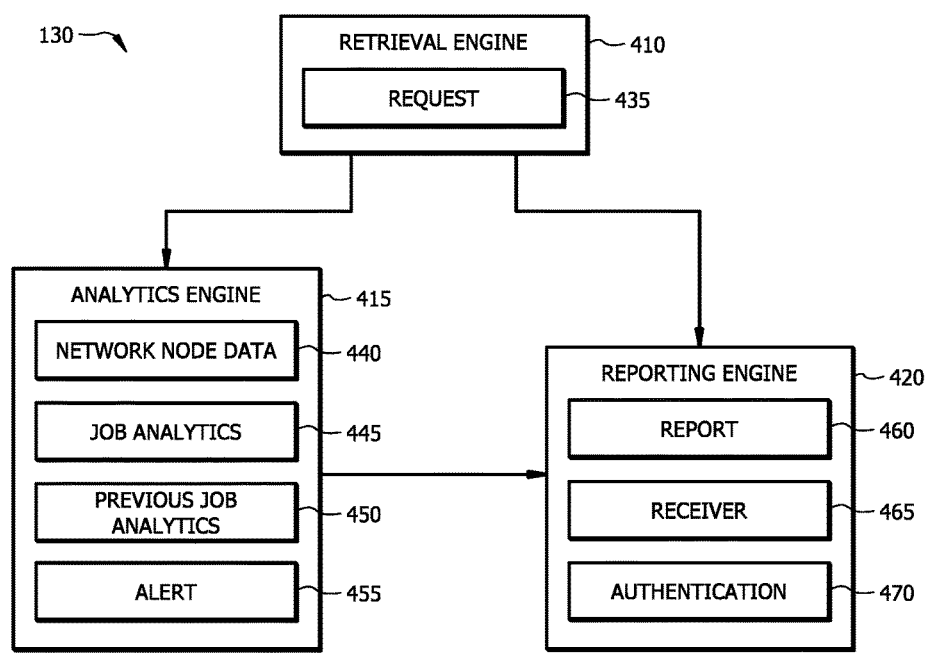
FIG. 4 illustrates the analytics tool of FIG. 1, in some embodiments.

FIG. 4 illustrates analytics tool 130 of system 100, in some embodiments. As illustrated in FIG. 4, analytics tool 130 includes retrieval engine 410, analytics engine 415, and reporting engine 420. In particular embodiments, analytics tool 135 decreases processing and memory usage by determining data errors in temporary data report 340 and/or network nodes 390.

Retrieval engine 410 receives request 435. In some embodiments, retrieval engine 410 comprises a network interface, such as interface 215 that receives request 435. Retrieval engine 410 may receive request 435 from devices 110. Request 435 is generally a request for job analytics 445 of a job. A job may be a data processing an uploading job. For example, a job may comprise network nodes 390 uploading batches 385. As another example, a job may comprise a network node 390 uploading temporary data table 340. Job analytics 445 indicate an amount of computer resources required to complete the job. For example, a job may require one or more network nodes 390 to expend processing resources, memory resources, storage resources, network bandwidth resources, and/or any other suitable resource. An example algorithm for retrieval engine to receive request 435 is as follows: wait to receive request 435; receive request 435 from devices 110; communicate request 435 to analytics engine 415 and reporting engine 420.

Analytics engine 415 generates job analytics 445. Analytics engine determines network node data 440 for each network node 390 used to complete a job. As previously discussed, upload engine 315 of upload tool 125 may determine a network node 390 to process and upload each batch 385. Analytics engine 415 determines each network node 390 used to upload batches 385 and receives network node data 440 for each network node 390. In some embodiments, analytics engine 415 retrieves network node data 440 for a network node 390 in real time as the network node 390 is processing and/or uploading a batch 385. Network node data 440 generally comprises analytics for each network node 390. Network node data 440 may comprise an amount of processing resources, memory resources, storage resources, network bandwidth resources, and/or any other suitable type of computer resources that a network node 390 expended in completing a job. Analytics engine 415 generates job analytics 445 by aggregating network node data 440 for each network node 390. An example algorithm for analytics engine 415 to generate job analytics 445 is as follows: wait to receive request 435; receive request 435 from retrieval engine 410; determine network nodes 390 used to complete a job identified in request 435; determine network node data 440 for each network node 390 used to complete the job; generate job analytics 445 by aggregating network node data 440 for each network node 390; communicate job analytics 445 to reporting engine 420.

Analytics engine 415 may compare job analytics 445 to previous job analytics 450. System 100 may complete substantially similar jobs. For example, upload tool 125 may generate and upload temporary data table 340 to database 120. Data in files 335 may change over time. Files 335 may remain substantially identical. Upload tool 125 may generate temporary data table 340 using files 335 that were used to generate a previous temporary data table, but with revised data. Thus, job analytics 445 should be substantially similar to previous job analytics 450. Analytics engine 415 compares job analytics 445 to previous job analytics 450 and generates alert 455 when analytics engine 415 detects an anomaly. An anomaly indicates that job analytics 445 and previous job analytics 450 differ by a predetermined amount. For example, analytics engine 415 may generate alert 455 when the processing usage increases by a predetermined amount and/or a predetermined percentage. Alert 455 may be communicated to devices 110. Alert 455 may indicate that that temporary data table 340 comprises an error and/or one or more network nodes 390 is not operating properly. Network node data 440, job analytics 445, and/or previous job analytics 450 may facilitate identifying and reducing errors.

An example algorithm for analytics engine 415 to generate alert 455 is as follows: generate job analytics 445; receive previous job analytics 450; compare job analytics 445 and previous job analytics 450; generate alert 455 when job analytics 445 and previous job analytics 450 differ by a predetermined amount; communicate alert 455 to devices 110; and communicate job analytics 445 to reporting engine 420.

Reporting engine 420 generates report 460 and communicates report 460 to devices 110. Report 460 includes job analytics 445. For example, report 460 indicates the amount of computer resources required to complete a job. Report 460 may comprise network node data 440 for one or more network nodes 390. Reporting engine 420 may communicate report 460 to devices 110. Reporting engine 420 may communicate a report via email, via a user interface, or any other suitable method. In some embodiments, report 460 may comprise restricted information. For example, only predetermined users 105 may view report 460. Reporting engine 420 may determine receiver 465. Receiver 465 indicates user 105 that is report 460. Receiver 465 may identify a single user 105 or any number of users 105. Reporting engine 470 may perform authentication 470 for receiver 465. Authentication 470 may include receiving a username and password, biometric data, or any other information to authenticate receiver 465. Authentication 470 determines whether receiver 465 is authorized to view report 460 before communicating report 460 to receiver 465.

An example algorithm for reporting engine 420 is as follows: receive job analytics 445; generate report 460 using job analytics 445; determine receiver 465; authenticate receiver 465 and determine whether receiver 465 is authorized to view report 460; communicate report 460 to device 110. In some embodiments, analytics engine 415 may communicate network node data 440 to reporting engine 420 to be included in report 460.

Modifications, additions, or omissions may be made to analytics tool 130 without departing from the scope of the invention. For example, analytics tool 130 may include any number of processors 210, interfaces 215 and/or memories 205. As another example, analytics tool 130 may be combined with upload tool 125, reporting tool 135, and/or any other suitable component of system 100.

Figure 5:
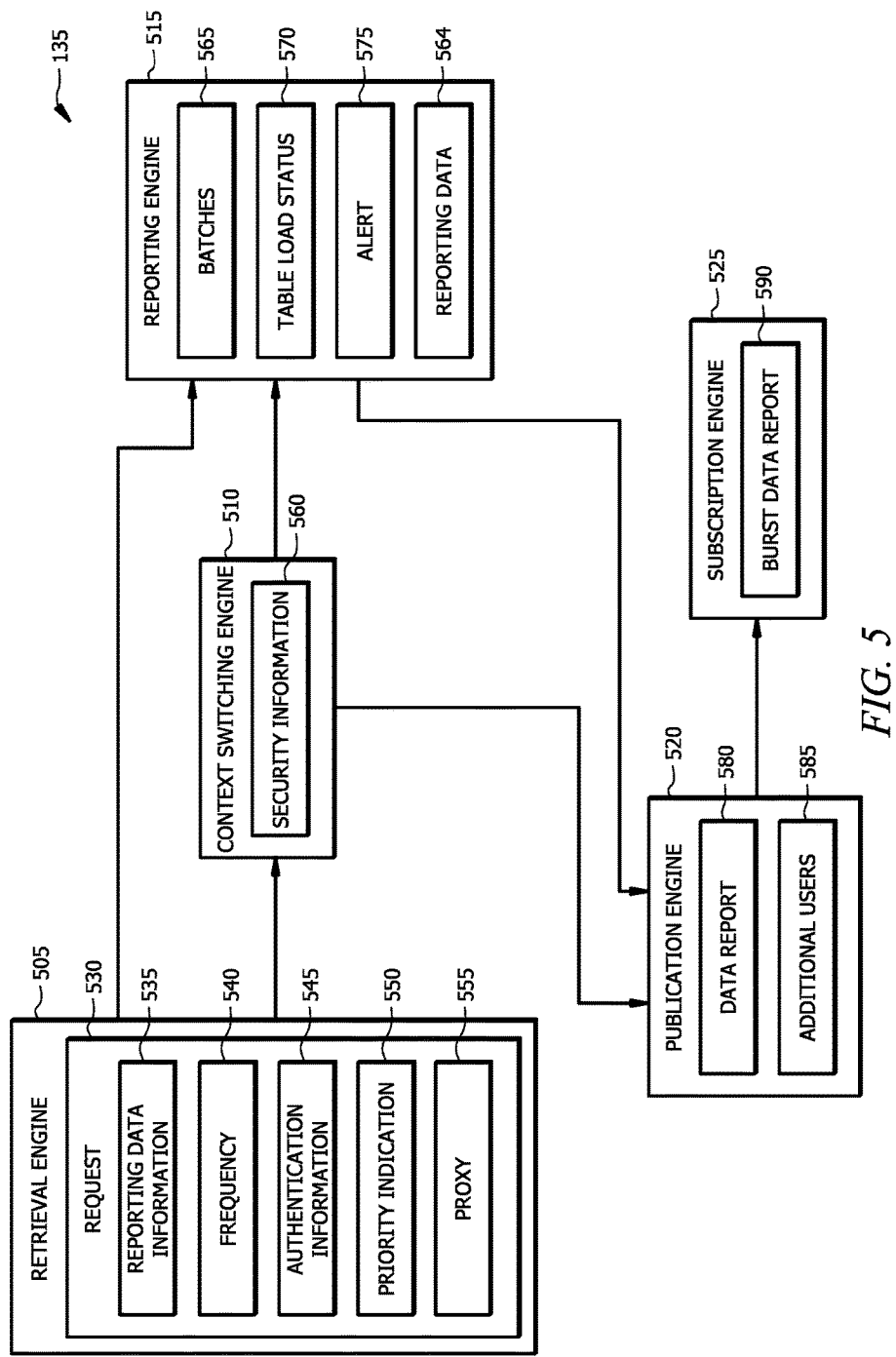
FIG. 5 illustrates the reporting tool of FIG. 1, in some embodiments.

FIG. 5 illustrates the reporting tool 135 of system 100, in some embodiments. As illustrated in FIG. 5, reporting tool 135 includes retrieval engine 505, context switching engine 510, reporting engine 515, publication engine 520, and subscription engine 525. In particular embodiments, upload tool 125 reduces processing requirements by communicating a single data report to multiple users 580.

Retrieval engine 505 receives request 530. In particular embodiments, request 530 includes reporting data information 535, frequency 540, authentication information 545, priority indication 550, and proxy 555. Request 530 is generally a request for a subscription to data report 580. Data report 580 generally includes a summary of reporting data 564. A subscription indicates to communicate report 580 at frequency 540. Frequency 540 may be once a day, once a month, once a quarter, or any other suitable time. For example, reporting tool 135 may communicate data report 580 once a month in response to request 530.

Reporting data information 535 indicates reporting data 564 to include in report 580. In some embodiments user 105 specifies the data to be included in data report 580 and indicates the data in reporting data information 535. Reporting data information 535 may include the location of reporting data 564 to include in data report 580. Request 530 may include authentication information 545. Authentication information 545 is generally used to authenticate the identity of user 105. Authentication information 545 may comprise a username and password, biometric data for user 105, and/or any other suitable type of information to authenticate user 105 In some embodiments, reporting data 564 may be restricted. Authentication information 545 facilitates determined whether user 105 is allowed to access data report 580 as will be explained in more detail in relation to context switching engine 510.

Request 530 may comprise priority indication 550. Generally priority indication 550 indicates the importance of data report 580. A user 105 may indicate that it is more important to receive data report 580 than other data reports. Reporting tool 135 may generate higher priority data reports first. Priority indication 550 may indicate that data report 580 is a level 1 priority, a level 2 priority, or a level 3 priority. Generally, upload tool 135 generates level 1 priority data reports before level 2 and level 3 priority reports. Request 530 may include proxy 555. Generally, user 105 submits request 530 via devices 110 and reporting tool 135 communicates data report 580 to user 105. At times however, user 105 may be unavailable to view data report 580 and may request to communicate data report 580 to proxy 555.

An example algorithm for retrieval engine 505 is as follows: wait to receive request 530; receive request 530; and communicate request 530 to context switching engine 510 and reporting engine 515.

Context switching engine generally determines whether user 105 is authorized to view data report 580. Context switching engine 510 receives authentication information 545 and generates security information 560. Context switching engine 510 may use authentication information 545 to determine the identity of user 105 who submitted request 530. Context switching engine 510 then communicates the authentication information 545 to databases 120. Context switching engine 510 may communicate authentication information 545 to one database 120 or any number of databases 120. Databases 120 may comprise security information 560 for a number of users 105. Security information 560 indicates whether a user 105 has access to particular data. In some embodiments, different databases 120 include security information 560 for different datasets. Context switching engine 510 determines the databases 120 that have security information 560 for reporting data 564, communicates a request to the databases 120 that have security information 560, the request including authentication information 545, and receives security information 560 for reporting data 564. Security information 560 indicates whether user 105 is authorized to view reporting data 564.

An example algorithm for context switching engine 510 is as follows: receive reporting data information 535 and authentication information 545; determine databases 120 that have security information 560 for reporting data 564 indicated by reporting data information 535; communicate request to database 120 for security information 560; receive security information 560 in response to the request; determine whether user 105 is authorized to view reporting data 564.

Reporting engine 515 retrieves reporting data 564. Reporting engine 515 receives reporting data information 535 from request 530 of retrieval engine 505 and determines reporting data 564 from reporting data information 545. Reporting engine 515 may determine the location of reporting data 564 using reporting data information 535. Reporting data 564 may be data stored in database 120. Data 564 may be data in files 335, temporary data table 340, and/or any other suitable data. Reporting engine 515 may determines table load status 570. Reporting data 564 may be updated periodically. For example, reporting data 564 may be updated once a day (or any other suitable time). Table load status 570 indicates whether reporting data 564 is up to date. If reporting data 564 is not up to date, reporting engine 515 generates alert 575 to indicate that reporting data 564 is not up to date and communicates alert 575 to user 105 via devices 110. If reporting data 564 is not up to date, reporting engine 515 may wait for reporting data 564 to be updated before retrieving reporting data 564.

Reporting engine 515 may generate batches 565. Each batch 565 comprises a subset of reporting data 564. Reporting engine 515 receives reporting data 564 and may determine the size of reporting data 564. If reporting data 564 is greater than a predetermined size, reporting engine 515 may break reporting data 564 into batches 565. An example algorithm for reporting engine 515 is as follows: receive reporting data information 535 and security information 560; determine whether user 105 is authorized to access reporting data 564 based on security information 560; determine that reporting data 564 is not up to date; generate alert 575; communicate alert 575 to device 110; determine that reporting data 564 is up to date; retrieve reporting data 564 based on reporting data information 535; generate batches 565 from reporting data 564; communicate batches to publication engine 520.

Publication engine 520 generates data report 580 and determines additional users 585. Publication engine 520 receives batches 565 from reporting engine 515 and processes the batches 565. Publication engine 520 aggregates the processed batches to generate data report 580. In some embodiments, publication engine 520 processes two or more batches 565 in parallel. Publication engine 520 may publish data report 580 in an HTML format, an XML format, or any suitable format. Publication engine 520 determines additional users 585. In some embodiments, data report 580 is communicated to a plurality of users 105. Data report 580 is generally communicated to the first user 105 who requested data report 580, and publication engine 520 determines whether to communicate data report 580 to additional users 105. Publication engine 520 may receive request 530 to determine additional users 585. As another example, publication engine 520 may receive a plurality of requests and determine that a plurality of users 105 are requesting a report for the same data. Publication engine 520 may generate a single data report 580 for each of the users. An example algorithm for publication engine 520 is as follows: receive batches 565; process batches 565; aggregate the processed batches 565 to generate data report 585; determine additional users 585; communicate data report 580 and additional users 585 to subscription engine 525.

Subscription engine 525 receives data report 580, additional users 585, and/or proxy 555 and communicates data report 580 to the first user 105, proxy 555, and/or additional users 585. Subscription engine 525 may communicate data report 580 via email, via FTP, via a user interface, or any other suitable method. In some embodiments, subscription engine 525 communicates data report 580 to devices 110. An example algorithm for subscription engine 525 to communicate data report 580 is as follows: receive data report 580; receive additional users 585; communicate data report 580 to devices 110.

Subscription engine 525 generates burst data report 590 in some embodiments. As previously discussed, data report 580 may comprise reporting data 564 (and/or a summary of reporting data 564) that is restricted. As another example, data report 580 may include information that is irrelevant to a user 105 who receives data report 580. Subscription engine 525 extracts information from data report 580 to generate burst data report 590. For example, a user 105 may not be authorized to view data report 580, but is authorized to view a subset of data report 580. Subscription engine 525 may determine which information a user 105 is authorized to view using security information 560. Subscription engine 525 extracts the subset of data report 580 that the user 105 is authorized to view to generate burst data report 590. Subscription engine 525 communicates burst data report 590 to the users 105 via devices 110 as discussed. As another example, only a subset of data report 580 may be relevant to a user 105. Subscription engine 525 extracts the relevant information from data report 580 to generate burst data report 590. An example algorithm for subscription engine 525 to generate burst data report 590 is as follows: receive data report 580 from publication engine 580; extract a subset of information from data report 580; generate burst data report 590 using the subset of information; communicate burst data report 590 to user devices 110.

Modifications, additions, or omissions may be made to reporting tool 135 without departing from the scope of the invention. For example, reporting tool 135 may include any number of processors 210, interfaces 215, and/or memories 205. reporting tool 135 may be combined with upload tool 125, analytics tool 130, and/or any other suitable component of system 100. While described as communicating a single data report 580, reporting tool 135 may communicate a plurality of data reports 580. For example, reporting tool 135 may generate and communicate a data report 580 at specific intervals determined by frequency 540.

Upload tool 125, analytics tool 130, and reporting tool 135 combine to create a fully integrated for uploading, analyzing, and reporting data. The fully integrated solution reduces processing power and memory usage by reducing errors in data and in data processing. Further, data uploading and processing speeds are increasing by uploading and processing batches of data in parallel.

Figure 6:
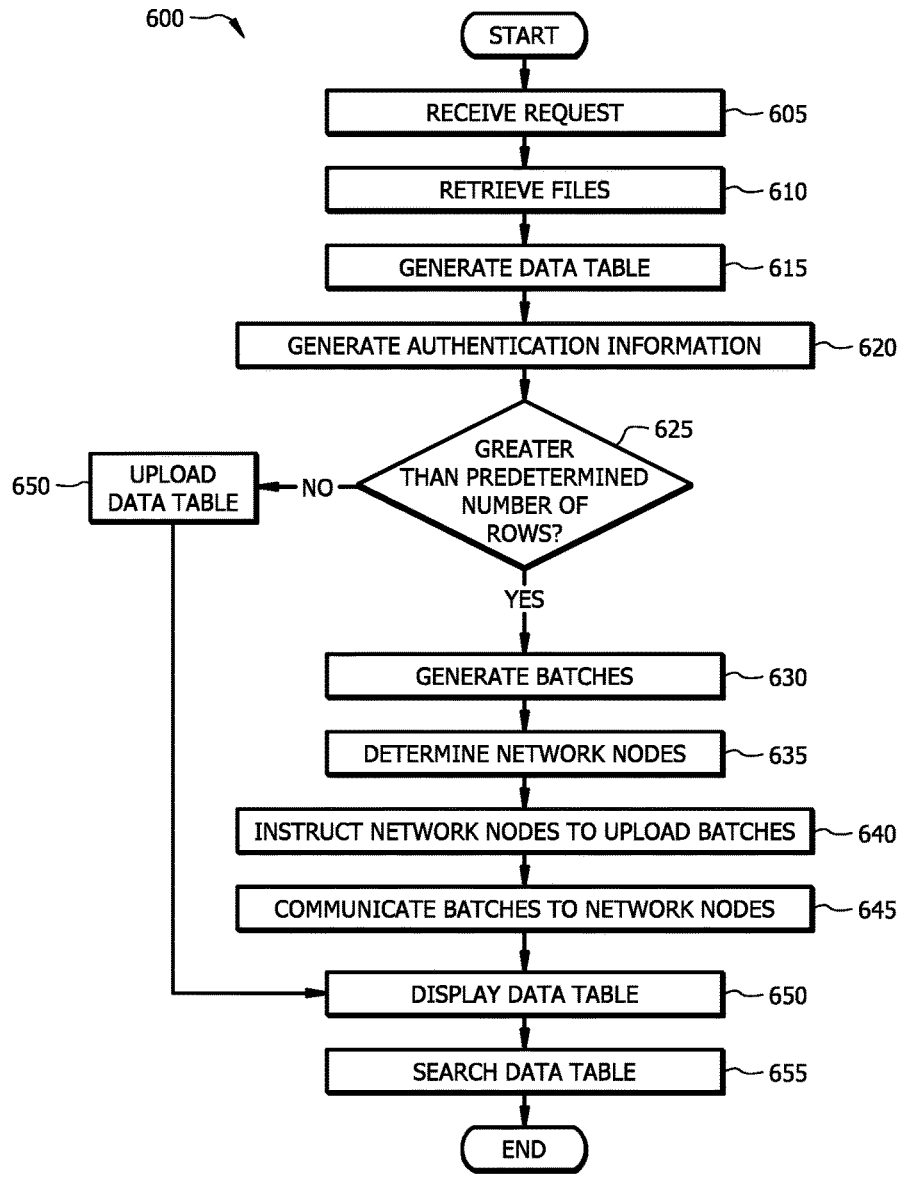
FIG. 6 is a flowchart illustrating a method for data communication and uploading using the system of FIG. 1

FIG. 6 illustrates method 600 for data communication and uploading using the system of system 100. In particular embodiments, upload tool 125 performs method 600. The method begins at step 605 where upload tool 125 receives request 330. Upload tool 125 retrieves files 610 in response to request 330 at step 610. At step 615, upload tool 125 generates temporary data table 340 using request 330 and files 335. Upload tool generates authentication information 345 at step 620. As discussed, temporary data table 340 may be restricted and a user 105 may be required to enter at least a portion of authentication information 345 to access temporary data table 345.

Upload tool 125 determines whether temporary data table 340 has greater than a predetermined number of rows of data at step 625. If upload tool 125 determines that temporary data table 340 does not have greater than a predetermined number of rows at step 625, upload tool uploads temporary data table 340 before proceeding to step 650. If upload tool 125 determines that temporary data table 340 does have more than a predetermined number of data rows at 625, upload tool 125 generates batches 385 at step 630. As previously discussed, upload tool 125 may break the data in temporary data table 340 into a plurality of batches 385. Upload tool 125 determines a network node 390 to upload each of the batches 385 at step 635. Upload tool 125 instructs the network nodes 390 to upload the batches 385 at step 640 and communicates batches 385 to network nodes 390 at step 645.

At step 650, upload tool 125 facilitates displaying temporary data table 340 to user 105. For example, upload tool 125 may communicate temporary data table 340 to device 110 to display temporary data table 340. As previously discussed, upload tool may communicate editing screen 370, delete option 375, and/or expiration date 380 to device 110 to display to user 110. Upload tool 125 facilitates searching temporary data table 340 at step 655. For example, upload tool 125 may generate search request 358 and receive search result 360 in response to search request 358 before the method ends.

Modifications, additions, or omissions may be made to method 600 depicted in FIG. 6. Method 600 may include more, fewer, or other steps. For example, steps may be performed in parallel or in any suitable order. While discussed as upload tool 125 performing the steps, any suitable component of system 100 may perform one or more steps of the method.

Figure 7:
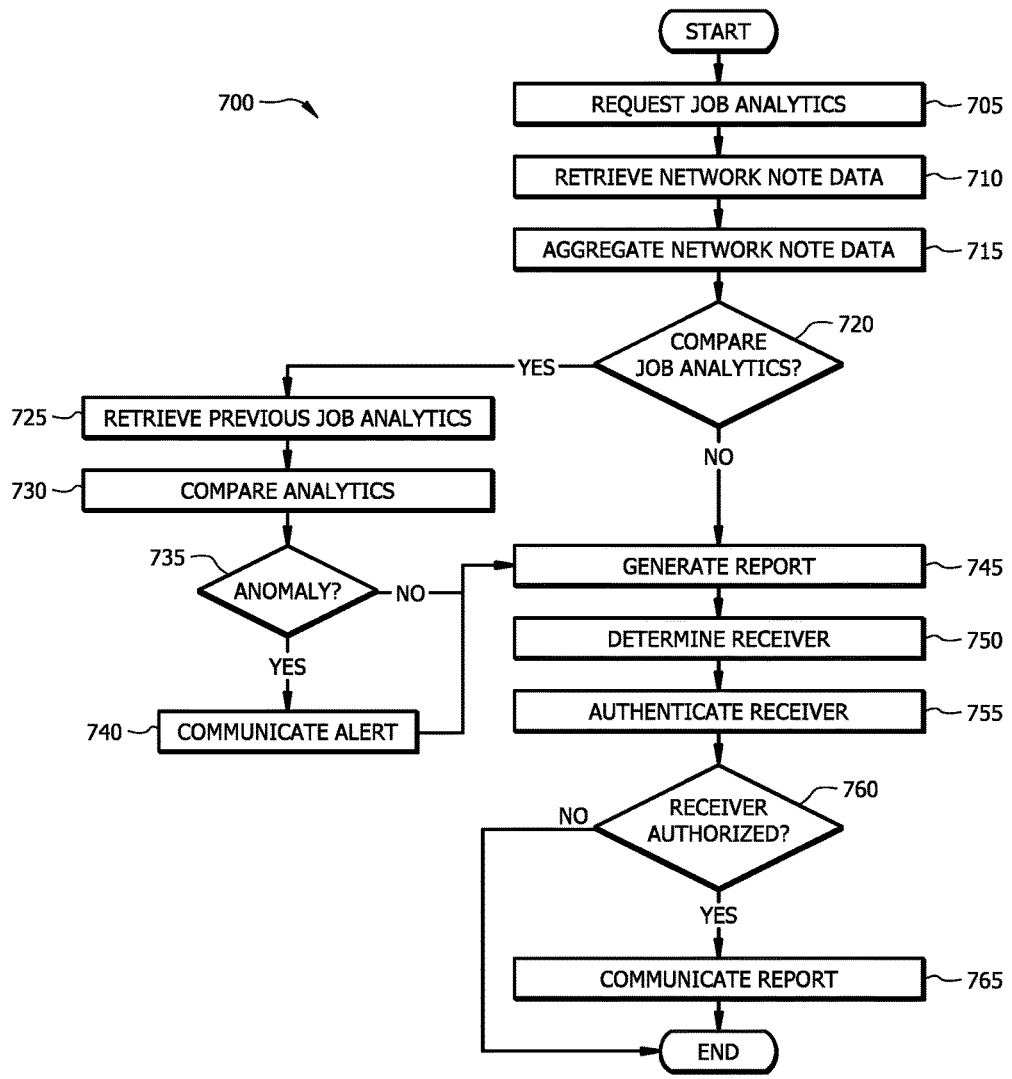
FIG. 7 is a flowchart illustrating a method for data analytics using the system of FIG. 1.

FIG. 7 illustrates method 700 for data analytics using system 100. In particular embodiments, analytics tool 130 performs method 700. The method begins at step 705 where analytics tool 130 receives request 435. Analytics tool 710 retrieves network node data 440 at step 710 and aggregates network node data 440 to generate job analytics 445 at step 715. At step 720, analytics tool 135 determines whether to compare job analytics 445 to previous job analytics 450. For example, request 435 may indicate to compare job analytics 445 to previous job analytics 450. If analytics tool 135 determines to not compare job analytics 445 to previous job analytics 450, the method proceeds to step 745. Otherwise the method proceeds to step 725.

Analytics tool 130 retrieves previous job analytics 450 at step 725. For example, analytics tool 130 may retrieve previous job analytics 450 from database 120. Analytics tool 130 compares job analytics 445 and previous job analytics 450 at step 730 to determine whether there is an anomaly. If there is an anomaly, analytics engine 130 generates alert 455 to communicate to devices 110.

If analytics tool 130 does not determine an anomaly at step 735, the method proceeds to step 745 where analytics tool 130 generates report 460 using job analytics 445 and/or network node data 440. Analytics tool 130 determines receiver 465 at step 750 and performs authentication 470 at step 755. Analytics tool 130 determines whether receiver 465 is authorized to review report 460 at step 760. If receiver 465 is not authorized to view report 460, the method ends. Otherwise, the method proceeds to step 765 where analytics tool 130 communicates report 360 to receiver 465 before the method ends.

Modifications, additions, or omissions may be made to method 700 depicted in FIG. 7. Method 700 may include more, fewer, or other steps. For example, steps may be performed in parallel or in any suitable order. As another example, analytics tool 130 may not authenticate user 465. While discussed as analytics tool 130 performing the steps, any suitable component of system 100 may perform one or more steps of the method.

Figure 8:
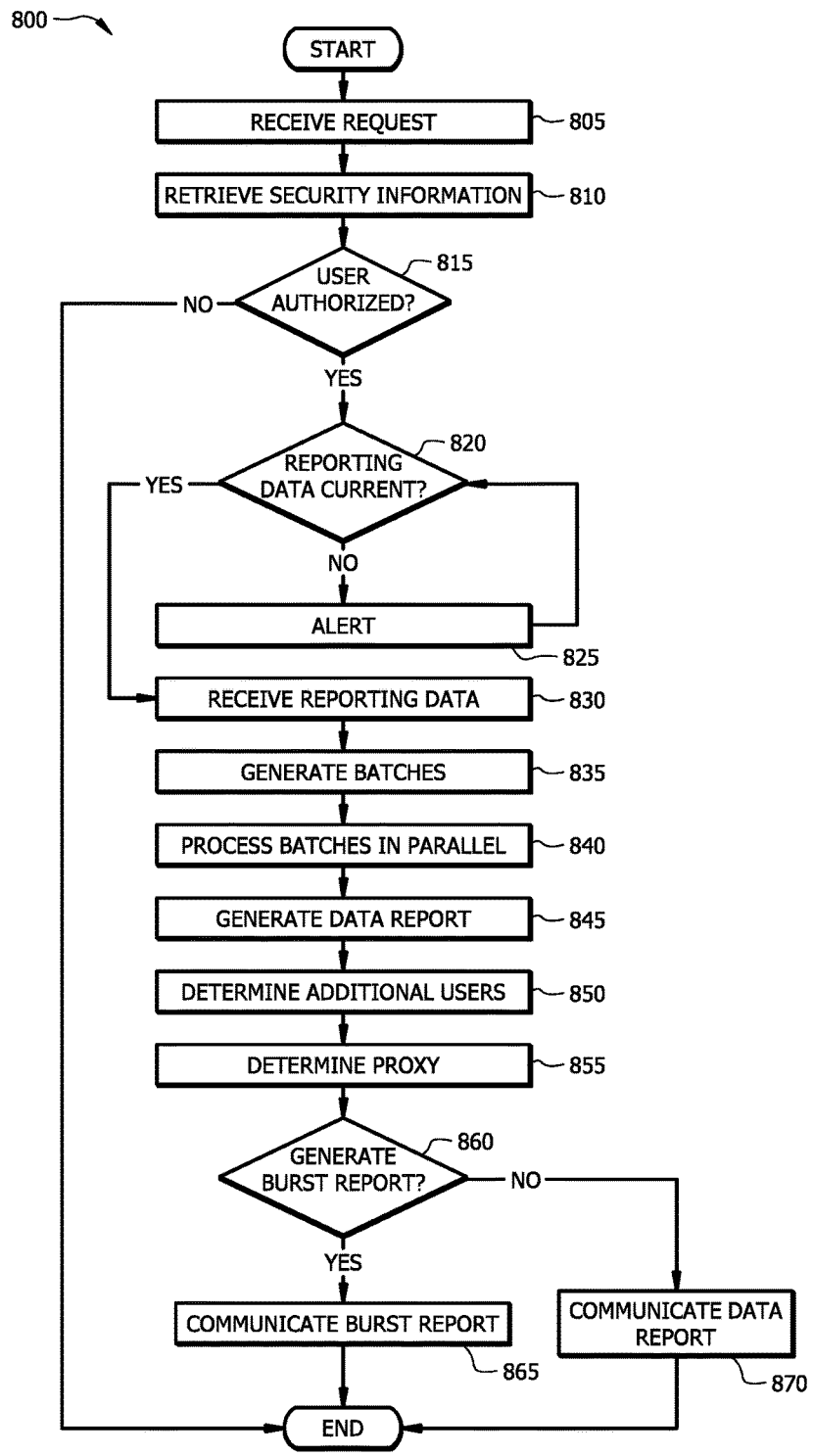
FIG. 8 is a flowchart illustrating a method for data reporting using the system of FIG. 1.

FIG. 8 illustrates method 800 for data reporting using system 100. In particular embodiments, reporting tool 135 performs method 800. The method begins at step 805 where reporting tool 135 receives request 520. Reporting tool 135 retrieves security information 560 at step 810. At step 815 reporting tool 135 determines whether the user 105 who submitted the request it authorized to view reporting data 564 using security information 560. If the user 105 is not authorized, the method ends.

If the user 105 is authorized at step 815, the method proceeds to step 820 where reporting tool 135 determines whether reporting data 564 is up to date. If reporting data 564 is not up to date, reporting tool 135 generates alert 575 at step 825 and returns to step 820. If reporting data 564 is up to date, reporting tool 135 receives reporting data 564 at step 830. Reporting tool 135 generates batches 565 at step 835 and process the batches in parallel at step 840. Reporting tool 135 generates date report 580 using the processed batches at step 845. Reporting tool 135 determines additional users 585 at step 850 and whether request 530 includes proxy 555 at step 855.

Reporting tool 135 determines whether to generate burst report 590 at step 860. If reporting tool 135 determines not to generate burst report 590 at step 860, reporting tool 135 communicates data report 580 to the user 105 who requested the data report 580, proxy 555, and/or additional users 585 before the method ends. If reporting tool 135 determines to generate burst report 590 at step 860, reporting tool 135 extracts information from data report 580 and generates burst report 590 using the extracted information. Reporting tool 135 communicates burst report 590 at step 865 before the method ends.

Modifications, additions, or omissions may be made to method 800 depicted in FIG. 8. Method 800 may include more, fewer, or other steps. For example, steps may be performed in parallel or in any suitable order. While discussed as reporting tool 135 performing the steps, any suitable component of system 100 may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A reporting tool comprising:
a hardware processor;
a retrieval engine implemented in the hardware processor, the retrieval engine configured to retrieve a request for a subscription to a data report comprising a summary of reporting data, the request for the subscription comprising:
reporting data information indicating the reporting data to include in the data report;
frequency information indicating a frequency to communicate the data report to a first user;
authentication information, authenticating an identity of the first user;
a priority indication; and
a proxy;
a context switching engine implemented in the hardware processor, the context switching engine configured to:
communicate a request for security information to one or more databases, the request for security information comprising the authentication information; and
receive the security information from the one or more databases, the security information indicating whether the first user is authorized to view the reporting data;
a reporting engine implemented in the hardware processor, the reporting engine configured to:
receive the reporting data from the one or more databases, wherein an error in the reporting data corrected based on collected analytics for a job;
determine a table load status indicating whether the reporting data is current;
upon a determination that the reporting data is not current, wait to retrieve the reporting data;
upon a determination that the reporting data is not current, communicate an alert to the first user, the alert indicating that the reporting engine is waiting to receive the reporting data;
retrieve the reporting data upon a determination that the reporting data is current; and
generate a plurality of batches, wherein each batch comprises a subset of the retrieved reporting data;
a publication engine implemented in the hardware processor, the publication engine configured to:
generate the data report before generating another data report which has a second priority indication that is lower than the priority indication, wherein generating the data report comprises:
processing the plurality of batches in parallel; and
aggregating the processed batches to generate the data report; and
determine whether the request for the subscription comprises a request to communicate the data report to one or more additional users; and
a subscription engine implemented in the hardware processor, the subscription engine configured to:
communicate the data report to the first user and to the proxy; and
upon a determination that the request for the subscription comprises a request to communicate the data report to additional users, communicate the data report to the one or more additional users.

2. The reporting tool of claim 1, wherein, the publication engine publishes the data report in one of HTML format and XML format.

3. The reporting tool of claim 1, wherein the subscription engine is operable to communicate the data report via one of email, FTP, and a user interface.

4. The reporting tool of claim 1, wherein the subscription engine is further configured to generate a burst and communicate the burst to the first user, wherein generating the burst comprises:
receiving the data report, wherein the user is not authorized to view the data report;
extracting a subset of data from the data report, wherein the user is authorized to view the subset of data; and
generating a burst report comprising the subset of data.

5. A method comprising:
retrieving a request for a subscription to a data report comprising a summary of reporting data, the request for the subscription comprising:
reporting data information indicating the reporting data to include in the data report;
frequency information indicating a frequency to communicate the data report to a first user;
authentication information, authenticating an identity of the first user;
a priority indication; and
a proxy;
communicating a request for security information to one or more databases, the request for security information comprising the authentication information;
receiving the security information from the one or more databases, the security information indicating whether the first user is authorized to view the reporting data;
receiving the reporting data from the one or more databases;
correcting an error in the reporting data based on collected analytics for a job;
determining a table load status indicating whether the reporting data is current;
upon a determination that the reporting data is not current, waiting to retrieve the reporting data;
upon a determination that the reporting data is not current, communicating an alert to the first user, the alert indicating that the reporting engine is waiting to receive the reporting data;
retrieving the reporting data upon a determination that the reporting data is current;
generating a plurality of batches, wherein each batch comprises a subset of the retrieved reporting data;
generating the data report before generating another data report which has a second priority indication that is lower than the priority indication, wherein generating the data report comprises:
processing the plurality of batches in parallel; and
aggregating the processed batches to generate the data report;
determining whether the request for the subscription comprises a request to communicate the data report to one or more additional users;
communicating the data report to the first user and to the proxy; and
upon a determination that the request for the subscription comprises a request to communicate the data report to additional users, communicating the data report to the one or more additional users.

6. The method of claim 5, wherein, the publication engine publishes the data report in one of HTML format and XML format.

7. The method of claim 5, wherein the data report is communicated via one of email, FTP, and a user interface.

8. The method of claim 5, further comprising generating a burst and communicate the burst to the first user, wherein generating the burst comprises:
- receiving the data report, wherein the user is not authorized to view the data report;
- extracting a subset of data from the data report, wherein the user is authorized to view the subset of data; and
- generating, a burst report comprising the subset of data.

9. A system comprising:
- a database; and
- a reporting tool comprising a hardware processor, the hardware processor configured to:
  - retrieve a request for a subscription to a data report comprising a summary of reporting data, the request for the subscription comprising:
    - reporting data information indicating the reporting data to include in the data report;
    - frequency information indicating a frequency to communicate the data report to a first user;
    - authentication information, authenticating an identity of the first user;
    - a priority indication; and
    - a proxy;
  - communicate a request for security information to the database, the request for security information comprising the authentication information;
  - receive the security information from the database, the security information indicating whether the first user is authorized to view the reporting data;
  - receive the reporting data from the one or more databases, wherein an error in the reporting data corrected based on collected analytics for a job;
  - determine a table load status indicating whether the reporting data is current;
  - upon a determination that the reporting data is not current, wait to retrieve the reporting data;
  - upon a determination that the reporting data is not current, communicate an alert to the first user, the alert indicating that the reporting engine is waiting to receive the reporting data;
  - retrieve the reporting data upon a determination that the reporting data is current;
  - generate a plurality of batches, wherein each batch comprises a subset of the reporting data;
  - generate the data report before generating another data report which has a second priority indication that is lower than the priority indication, wherein generating the data report comprises:
    - processing the plurality of batches in parallel; and
    - aggregating the processed batches to generate the data report;
  - determine whether the request for the subscription comprises a request to communicate the data report to one or more additional users;
  - communicate the data report to the first user and to the proxy; and
  - upon a determination that the request for the subscription comprises a request to communicate the data report to additional users, communicate the data report to the one or more additional users.

10. The system of claim 9, wherein, the publication engine publishes the data report in one of HTML format and XML format.

11. The system of claim 9, wherein the reporting tool is communicates the data report via one of email, FTP, and a user interface.

12. The system of claim 9, wherein the reporting tool is further configured to generate a burst and communicate the burst to the first user, wherein generating the burst comprises:
- receiving the data report, wherein the user is not authorized to view the data report;
- extracting a subset of data from the data report, wherein the user is authorized to view the subset of data; and
- generating a burst report comprising the subset of data.

* * * * *